United States Patent
Schwarz et al.

(10) Patent No.: US 11,149,644 B2
(45) Date of Patent: *Oct. 19, 2021

(54) HEAT EXCHANGE MODULE FOR A TURBINE ENGINE

(71) Applicant: Raytheon Technologies Corporation, Farmington, CT (US)

(72) Inventors: Frederick M. Schwarz, Glastonbury, CT (US); John T. Schmitz, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 287 days.

This patent is subject to a terminal disclaimer.

(21) Appl. No.: 16/360,329

(22) Filed: Mar. 21, 2019

(65) Prior Publication Data

US 2019/0218973 A1 Jul. 18, 2019

Related U.S. Application Data

(60) Continuation of application No. 15/412,729, filed on Jan. 23, 2017, now Pat. No. 10,240,531, which is a
(Continued)

(51) Int. Cl.

| | |
|---|---|
| *F02C 7/18* | (2006.01) |
| *B64D 33/12* | (2006.01) |
| *F02C 7/12* | (2006.01) |
| *F02K 3/077* | (2006.01) |
| *B64D 33/10* | (2006.01) |
| *F01D 25/14* | (2006.01) |
| *B64D 33/08* | (2006.01) |

(Continued)

(52) U.S. Cl.
CPC ............. *F02C 7/185* (2013.01); *B64D 33/08* (2013.01); *B64D 33/10* (2013.01); *B64D 33/12* (2013.01); *F01D 25/08* (2013.01); *F01D 25/14* (2013.01); *F02C 7/12* (2013.01); *F02C 7/14* (2013.01); *F02C 7/32* (2013.01); *F02K 3/077* (2013.01); *F02K 3/105* (2013.01); *F02K 3/115* (2013.01); *B64D 2033/024* (2013.01); *F05D 2260/20* (2013.01); *F05D 2260/213* (2013.01); *F28D 2021/0021* (2013.01); *F28D 2021/0026* (2013.01); *Y02T 50/60* (2013.01)

(58) Field of Classification Search
CPC ........ B64D 33/08; B64D 33/10; B64D 33/12; B64D 2033/024; F01D 25/08; F01D 25/14; F02C 7/12; F02C 7/14; F02C 7/185; F02K 3/105; F02K 3/115; F28D 2021/0021; F28D 2021/0026
See application file for complete search history.

(56) References Cited

U.S. PATENT DOCUMENTS

| | | |
|---|---|---|
| 1,549,202 A | 2/1922 | McClane |
| 2,295,115 A | 9/1942 | Keller |

(Continued)

*Primary Examiner* — Scott J Walthour
(74) *Attorney, Agent, or Firm* — Getz Balich LLC (57) ABSTRACT

A heat exchange module is provided for a turbine engine. The heat exchange module includes a duct and a plurality of heat exchangers. The duct includes a flowpath defined radially between a plurality of concentric duct walls. The flowpath extends along an axial centerline through the duct between a first duct end and a second duct end. The heat exchangers are located within the flowpath, and arranged circumferentially around the centerline.

18 Claims, 5 Drawing Sheets

Related U.S. Application Data division of application No. 13/630,164, filed on Sep. 28, 2012, now abandoned.

(51) Int. Cl.
*F01D 25/08* (2006.01)
*F02C 7/14* (2006.01)
*F02C 7/32* (2006.01)
*F02K 3/105* (2006.01)
*F02K 3/115* (2006.01)
*B64D 33/02* (2006.01)
*F28D 21/00* (2006.01)

(56) References Cited

U.S. PATENT DOCUMENTS

| | | | |
|---|---|---|---|
| 4,516,628 A | 5/1985 | Ward | |
| 5,261,227 A | 11/1993 | Giffin, III | |
| 5,577,551 A * | 11/1996 | Kritzler | F28D 19/047 165/8 |
| 5,697,211 A * | 12/1997 | Kawaguchi | B01D 53/9481 60/301 |
| 6,357,221 B1 | 3/2002 | Schroeder et al. | |
| 6,484,799 B1 | 11/2002 | Irish | |
| 7,810,311 B2 | 10/2010 | Schwarz et al. | |
| 7,814,966 B2 | 10/2010 | Prior | |
| 7,861,512 B2 | 1/2011 | Olver et al. | |
| 8,127,828 B2 | 3/2012 | Schwarz et al. | |
| 8,161,726 B2 | 4/2012 | Schwarz | |
| 8,205,427 B2 | 6/2012 | Schwarz et al. | |
| 10,240,531 B2 * | 3/2019 | Schwarz | F01D 25/14 |
| 2007/0215326 A1 | 9/2007 | Schwarz et al. | |
| 2008/0028763 A1 | 2/2008 | Schwarz et al. | |
| 2012/0000205 A1 | 1/2012 | Coffinberry et al. | |
| 2012/0060466 A1 | 3/2012 | Schwarz et al. | |
| 2012/0144842 A1 | 6/2012 | Snyder | |

* cited by examiner

HEAT EXCHANGE MODULE FOR A TURBINE ENGINE

This application is a continuation of U.S. patent application Ser. No. 15/412,729 filed Jan. 23, 2017, which is a divisional of U.S. patent application Ser. No. 13/630,164 filed Sep. 28, 2012, the disclosures of which are hereby incorporated herein by reference in their entireties.

BACKGROUND OF THE INVENTION

1. Technical Field

This disclosure relates generally to a turbine engine and, more particularly, to a heat exchanger for a turbine engine.

2. Background Information

Various turbine engine systems as well as aircraft systems may generate significant quantities of heat energy as a byproduct during operation. Examples of such a turbine engine system include an electrical generator and a lubrication system. An example of such an aircraft system includes a high powered sensor system. One or more of these systems may be cooled by circulating a cooling medium between respective system heat exchangers and a flowpath heat exchanger. The system heat exchangers are thermally coupled with the systems being cooled. The flowpath heat exchanger is arranged within a flowpath of the engine. The flowpath heat exchanger, for example, may be fixedly mounted in the flowpath to a turbine engine case.

There is a need in the art for an improved flowpath heat exchanger.

SUMMARY OF THE DISCLOSURE

According to an aspect of the invention, a heat exchange module is provided for a turbine engine. The heat exchange module includes a duct and a plurality of heat exchangers. The duct includes a flowpath defined radially between a plurality of concentric duct walls. The flowpath extends along an axial centerline through the duct between a first duct end and a second duct end. The heat exchangers are located within the flowpath, and arranged circumferentially around the centerline.

According to another aspect of the invention, a turbine engine with an axial centerline is provided that includes a core, annular engine flowpath defined radially between a plurality of turbine engine cases, and a heat exchange module connected to a first of the turbine engine cases. The core includes a compressor section, a combustor section and a turbine section. The engine flowpath extends axially between an inlet and an outlet and circumferentially around the core. The heat exchange module includes a duct and a plurality of heat exchangers. The duct includes an annular duct flowpath formed radially between a plurality of duct walls, where the duct flowpath extends axially through the duct and is coupled with the engine flowpath. The heat exchangers are located with the duct flowpath, and arranged circumferentially around the centerline.

According to another aspect of the invention, a turbine engine with an axial centerline is provided that includes a core, an annular engine flowpath defined radially between a plurality of turbine engine cases, and a heat exchange module connected to a first of the turbine engine cases. The core includes a compressor section, a combustor section and a turbine section. The engine flowpath extends axially between an inlet and an outlet and circumferentially around the core. The heat exchange module includes a duct and a plurality of heat exchangers. The duct includes a duct flowpath defined by a duct wall that extends circumferentially about the centerline. The duct flowpath extends axially through the duct and circumferentially about the centerline, and the duct flowpath is fluidly coupled inline with the engine flowpath. The heat exchangers are located with the duct flowpath and arranged circumferentially about the centerline.

One or more of the heat exchangers may have an arcuate geometry.

One or more of the heat exchangers may have a rectangular geometry.

At least a portion of a first of the duct walls may have a polygonal cross-sectional geometry.

The first of the duct walls may include a transition segment that extends axially from the first duct end to a heat exchanger segment, which has a polygonal cross-sectional geometry. The transition segment may have a cross-sectional geometry that transitions from a circular cross-section geometry at the first duct end to the polygonal cross-sectional geometry at the heat exchanger segment. The first of the duct walls may also include a second transition segment that extends axially from the second duct end to the heat exchanger segment. The second transition segment may have a cross-sectional geometry that transitions from a circular cross-sectional geometry at the second duct end to the polygonal cross-sectional geometry at the heat exchanger segment.

At least a portion of a second of the duct walls may have a polygonal cross-sectional geometry.

An actuator may be included that moves a first of the heat exchangers between a deployed position and a stowed position. In one embodiment, the first of the heat exchangers may be located within the duct flowpath in the deployed position, and located adjacent to (e.g., outside of) the duct flowpath in the stowed position. In another embodiment, the first of the heat exchangers may pivot within the duct flowpath about an axis between the deployed position and the stowed position.

A baffle may be arranged circumferentially between a first and a second of the heat exchangers. A second actuator may be included that moves the baffle between a deployed position and a stowed position.

The first of the turbine engine cases may include a plurality of case segments. A first of the duct walls may be connected axially between the case segments.

An annular second engine flowpath may be formed radially between one of the turbine engine cases and a third turbine engine case. The second engine flowpath may extend axially between a second inlet and a second outlet, and circumferentially around the core and within the engine flowpath.

The foregoing features and the operation of the invention will become more apparent in light of the following description and the accompanying drawings.

DETAILED DESCRIPTION OF THE INVENTION

Figure 1:
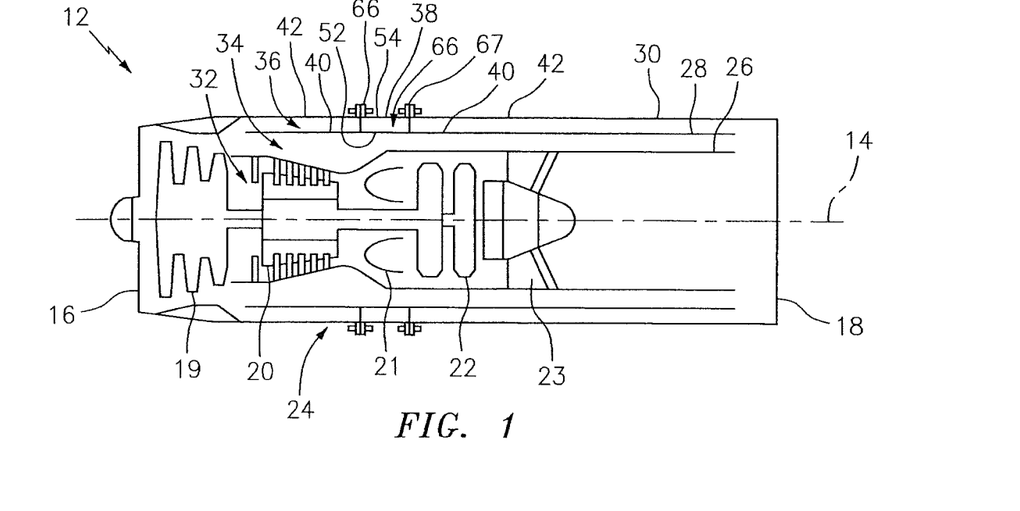
FIG. 1 is a sectional illustration of a turbine engine.

FIG. 1 illustrates a turbine engine 12 that extends along an axial centerline 14 between an upstream airflow inlet 16 and a downstream airflow exhaust 18. The engine 12 includes a fan section 19, a compressor section 20, a combustor section 21, a turbine section 22, and/or an augmentor section 23. The compressor section 20, the combustor section 21 and the turbine section 22 form a core 24 of the engine 12.

The engine also includes a plurality of concentric turbine engine cases 26, 28 and 30, a plurality of concentric annular engine flowpaths 32, 34 and 36, and a heat exchange module 38. The first case 26 houses the core 24 and the augmentor section 23. The second case 28 extends circumferentially around the first case 26, and includes a plurality of axial second case segments 40. The third case 30 houses the fan section 19 and extends circumferentially around the second case 28. The third case 30 includes a plurality of axial third case segments 42.

The first engine flowpath 32 (e.g., a central core flowpath) is defined by the first case 26, and extends axially through the core 24 and the augmentor section 23. The second engine flowpath 34 (e.g., a primary bypass flowpath) is defined radially between the first case 26 and the second case 28, and extends axially between an inlet and an outlet. The third engine flowpath 36 (e.g., a secondary bypass flowpath) is defined radially between the second case 28 and the third case 30, and extends axially between an inlet and an outlet.

Figure 2:
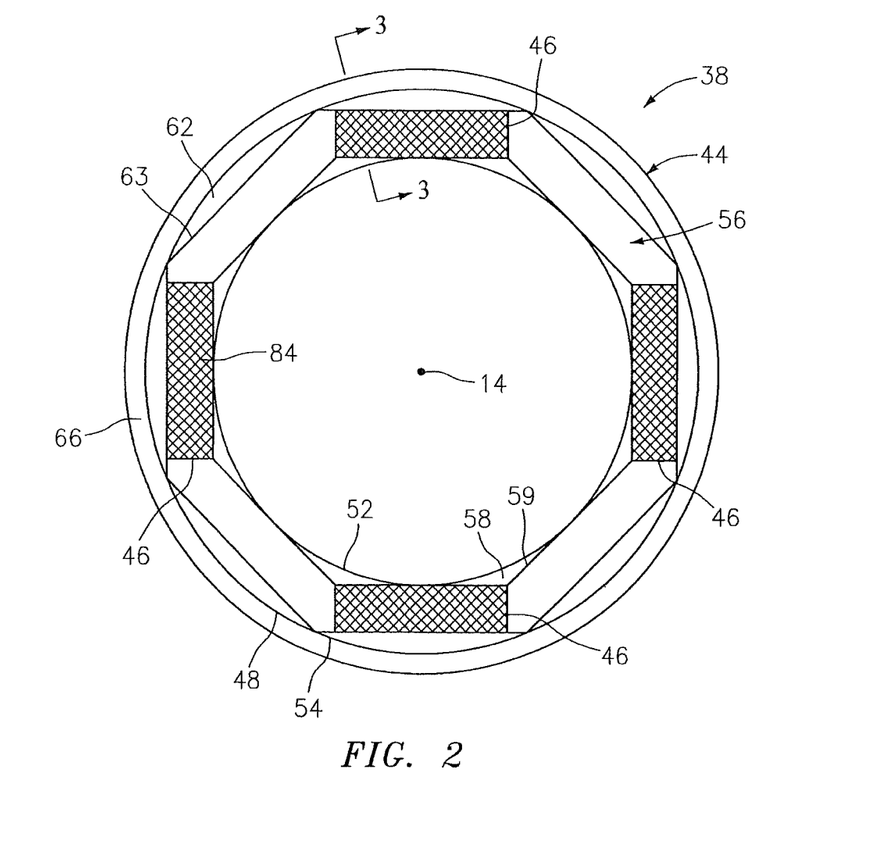
FIG. 2 is an illustration of a heat exchange module included in the turbine engine of FIG. 1.
Figure 3:
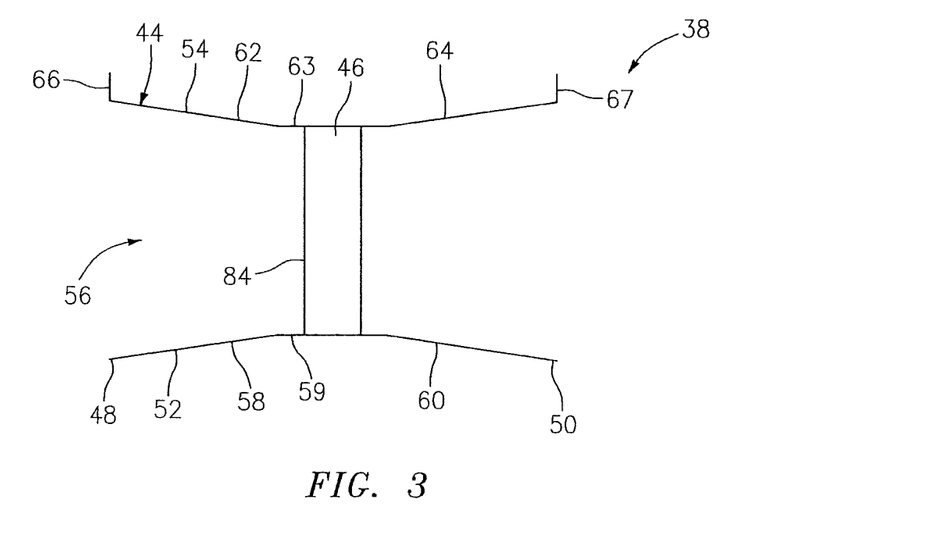
FIG. 3 is a partial, sectional illustration of the heat exchange module of FIG. 2.

Referring to FIGS. 2 and 3, the heat exchange module 38 includes a substantially annular duct 44 and one or more flowpath heat exchangers 46. The duct 44 extends axially between an upstream first duct end 48 and a downstream second duct end 50. The duct 44 includes a radial inner first duct wall 52, a radial outer second duct wall 54, and a substantially annular duct flowpath 56. For example, in FIG. 2 the duct flowpath 56 may have an octagonal shape.

The first duct wall 52 includes a first transition segment 58, a heat exchanger segment 59 and a second transition segment 60. The first transition segment 58 extends axially from the first duct end 48 to the heat exchanger segment 59. The first transition segment 58 has a cross-sectional geometry that transitions from a circular cross-sectional geometry at the first duct end 48 to an equilateral polygonal cross-sectional geometry at the heat exchanger segment 59. The heat exchanger segment 59 extends axially between the first and the second transition segments 58 and 60, and has an equilateral polygonal cross-sectional geometry. The second transition segment 60 extends axially from the heat exchanger segment 59 to the second duct end 50. The second transition segment 60 has a cross-sectional geometry that transitions from an equilateral polygonal cross-sectional geometry at the heat exchanger segment 59 to a circular cross-sectional geometry at the second duct end 50.

The second duct wall 54 includes a first transition segment 62, a heat exchanger segment 63 and a second transition segment 64. The first transition segment 62 extends axially from the first duct end 48 to the heat exchanger segment 63. The first transition segment 62 has a cross-sectional geometry that transitions from a circular cross-sectional geometry at the first duct end 48 to an equilateral polygonal cross-sectional geometry at the heat exchanger segment 63. The heat exchanger segment 63 extends axially between the first and the second transition segments 62 and 64, and has an equilateral polygonal cross-sectional geometry. The second transition segment 64 extends axially from the heat exchanger segment 63 to the second duct end 50. The second transition segment 64 has a cross-sectional geometry that transitions from an equilateral polygonal cross-sectional geometry at the heat exchanger segment 63 to a circular cross-sectional geometry at the second duct end 50.

The second duct wall 54 also includes one or more annular flanges 66 and 67. The first flange 66 extends radially out from the first transition segment 62 at (e.g., on, adjacent or proximate) the first duct end 48. The second flange 67 extends radially out from the second transition segment 64 at the second duct end 50.

The duct flowpath 56 is defined radially between the first duct wall 52 and the second duct wall 54. The duct flowpath 56 extends axially through the duct 44 between the first duct end 48 and the second duct end 50. Referring to FIG. 1, the duct flowpath 56 is concentric with the first and the second engine flowpaths 32 and 34.

Figure 4:
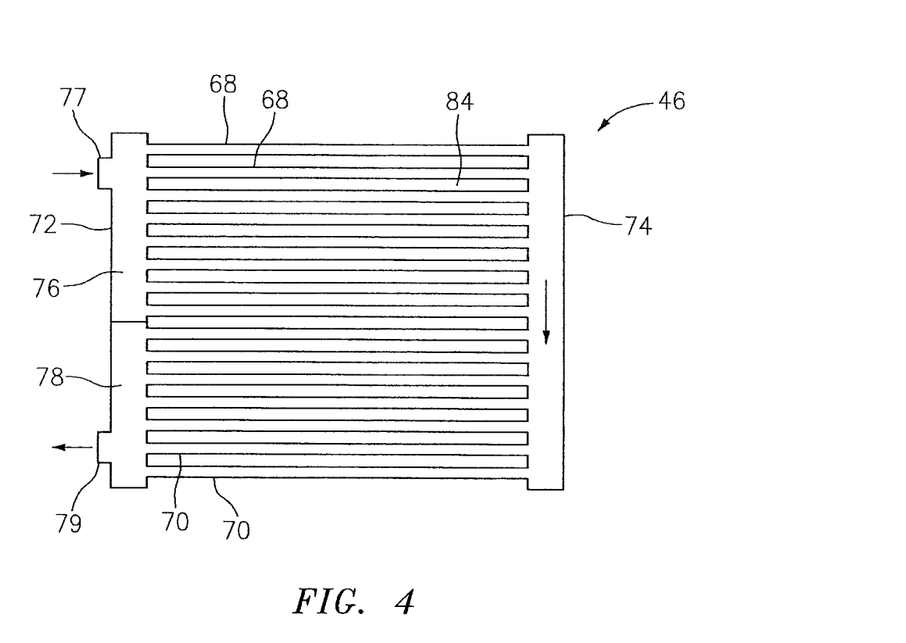
FIG. 4 is an illustration of a broadside of a heat exchanger included in the heat exchange module of FIG. 2.

Each of the heat exchangers 46 of FIG. 4 includes a plurality of spaced parallel tubes 68 and 70 that extend laterally (e.g., circumferentially or tangentially) between a first manifold 72 and a second manifold 74. The heat exchanger 46 embodiment of FIG. 4 is configured as a counterflow heat exchanger. The first manifold 72 includes a distribution region 76 with an inlet 77 and a collection region 78 with an outlet 79. The tubes 68 fluidly couple the distribution region 76 to the second manifold 74. The tubes 70 fluidly couple the second manifold 74 to the collection region 78. The present invention, however, is not limited to any particular heat exchanger type and/or configuration.

Referring to FIGS. 2 and 3, the heat exchangers 46 are arranged circumferentially around the centerline 14. The heat exchangers 46 are located within the duct flowpath 56 and extend radially between the first duct wall 52 and the second duct wall 54. The heat exchangers 46 are fixedly and/or movably connected to one or both of the heat exchanger segments 59 and 63.

Referring to FIG. 1, the duct flowpath 56 is fluidly coupled inline with the third engine flowpath 36. The first duct wall 52 is arranged axially between the second case segments 40. The second duct wall 54 is arranged axially between and connected to the third case segments 42. The first flange 66 is connected to a corresponding annular flange of the third case segment 42 with a plurality of fasteners. The second flange 67 is connected to a corresponding annular flange of the third case segment 42 with a plurality of fasteners.

Various turbine engine systems such as electrical generators, lubrication systems, etc. as well as aircraft systems such as high powered sensor systems, etc. may generate significant quantities of heat energy as a byproduct during operation. One or more of these systems may be cooled by circulating a cooling medium such as air, coolant, oil, etc. between respective system heat exchangers and the heat exchange module 38. The system heat exchangers, for example, may transfer the heat energy generated by the turbine engine and/or aircraft systems into the cooling medium. The heat exchanger 46 of FIGS. 3 and 4 may receive the now relatively hot cooling medium from one or more of the system heat exchangers. The distribution region 76 directs the cooling medium into the tubes 68. The tubes 68 may transfer heat energy from the cooling medium into bypass gas, which is flowing through the duct flowpath 56 and the heat exchanger 46 from the third engine flowpath 36 (see FIG. 1). The second manifold 74 directs the cooling medium from the tubes 68 to the tubes 70. The tubes 70 may transfer additional heat energy from the cooling medium into the bypass gas. The collection region 78 collects the now relatively cool cooling medium from the tubes 70, and the heat exchanger 46 may provide the cooling medium back to the system heat exchangers to repeat the heat exchange process.

In some embodiments, one or more (e.g., each) of the heat exchangers 46 are adapted to move between a deployed position and a stowed position. For example, each heat exchanger 46 may radially translate into and out of the duct flowpath 56 between the deployed position of FIG. 5A and the stowed position of FIG. 5B. In another example, each heat exchanger 46 may pivot (e.g., approximately 90°) within the duct flowpath 56 about a lateral axis 80 between the deployed position of FIG. 6A and the stowed position of FIG. 6B. In still another example, each heat exchanger 46 may pivot (e.g., approximately 90°) within the duct flowpath 56 about a radial axis 82 between the deployed position of FIG. 7A and the stowed position of FIG. 7B.

Figure 5A:
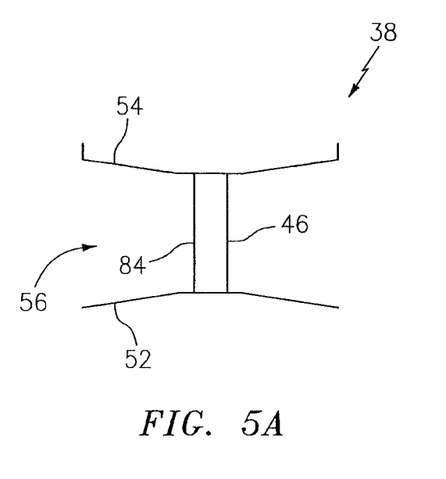
FIG. 5A is a partial, sectional illustration of the heat exchange module of FIG. 2 with a heat exchanger in a deployed position.
Figure 5B:
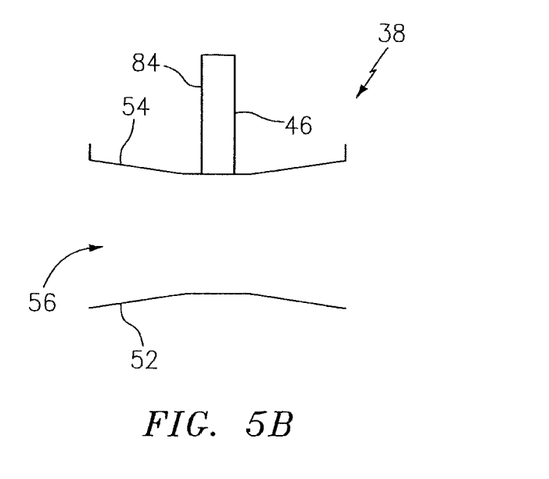
FIG. 5B is a partial, sectional illustration of the heat exchange module of FIG. 5A with the heat exchanger in a stowed position.
Figure 6A:
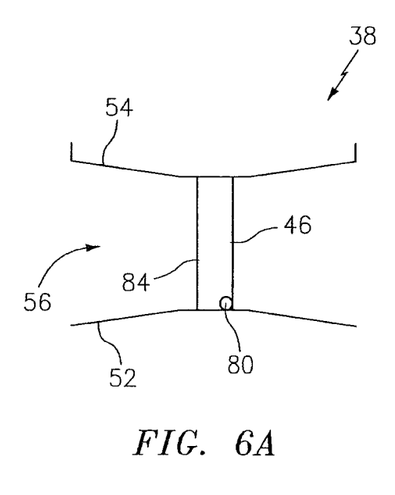
FIG. 6A is a partial, sectional illustration of another heat exchange module with a heat exchanger in a deployed position.
Figure 6B:
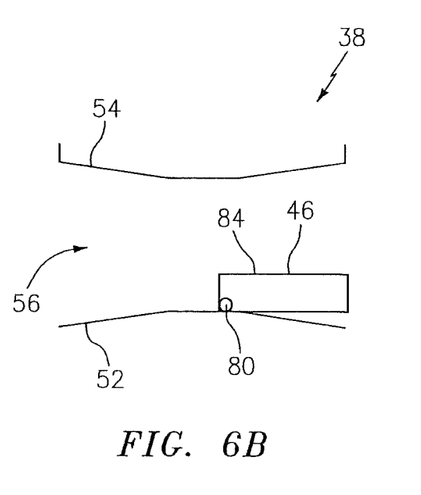
FIG. 6B is a partial, sectional illustration of the heat exchange module of FIG. 6A with the heat exchanger in a stowed position.
Figure 7A:
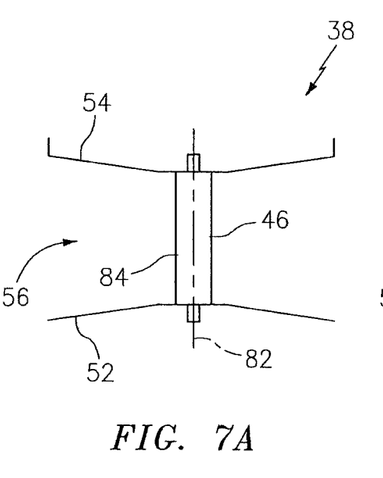
FIG. 7A is a partial, sectional illustration of another heat exchange module with a heat exchanger in a deployed position.
Figure 7B:
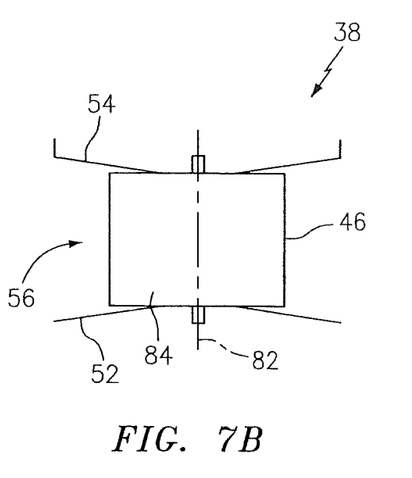
FIG. 7B is a partial, sectional illustration of the heat exchange module of FIG. 7A with the heat exchanger in a stowed position.

In the deployed position, each heat exchanger 46 is arranged such that a relatively large quantity of the bypass gas flows through the heat exchanger 46. In the embodiment of FIG. 5A, for example, the heat exchanger 46 is located within the duct flowpath 56 with its broadside 84 arranged substantially perpendicular to the flow of the bypass gas. In contrast, in the stowed position, each heat exchanger 46 is arranged such that a relatively small quantity or none of the bypass gas flows through the heat exchangers 46. In the embodiment of FIG. 5B, for example, the heat exchanger 46 is located adjacent to and outside of the duct flowpath 56. In the embodiment of FIGS. 6B and 7B, the heat exchanger 46 is located within the duct flowpath 56 with its broadside 84 arranged substantially parallel to the flow of the bypass gas. In this manner, the heat exchange module 38 reduces pressure drop across the third engine flowpath 36 (see FIG. 1) and may increase engine efficiency and/or power by selectively moving one or more of the heat exchangers 46 into the stowed position when the cooling needs for the turbine engine and/or aircraft systems are relatively low.

Figure 8:
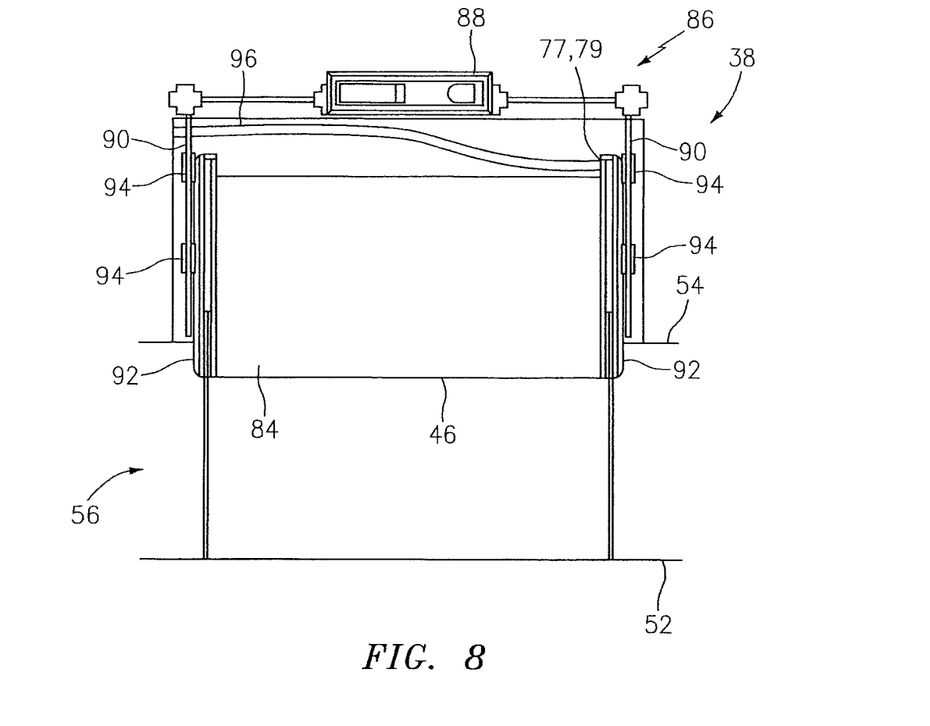
FIG. 8 is a partial cross-sectional illustration of the heat exchange module of FIG. 2.

FIG. 8 illustrates an actuator 86 adapted to move at least one of the heat exchangers 46 between the deployed position of FIG. 5A and the stowed position of FIG. 5B. The actuator 86 includes an electric motor 88 that turns one or more threaded jackscrews 90. Opposite narrow-side ends 92 of the heat exchanger 46 are connected to the jackscrews 90 by way of a set of threaded followers 94 (e.g., threaded nuts). As the motor 88 rotates the jackscrews 90, the followers 94 and the heat exchanger 46 connected thereto move radially into and out of the duct flowpath 56 between the deployed and the stowed positions.

A person of skill in the art will recognize various actuator configurations other than that described above and illustrated in FIG. 8 may be utilized to move the heat exchangers 46 between the deployed and the stowed positions. The actuator, for example, may include a motor that is connected to a respective heat exchanger by way of a shaft, where the actuator pivots the heat exchanger about an axis of the shaft between the deployed and the stowed positions. The present invention therefore is not limited to any particular actuator configurations.

Referring still to the embodiment of FIG. 8, the inlet 77 and/or the outlet 79 of each heat exchanger 46 are connected to flexible hoses 96, only one of which is shown for ease of illustration. The flexible hoses 96 enable the heat exchanger 46 to move between the deployed and the stowed positions.

Figure 9:
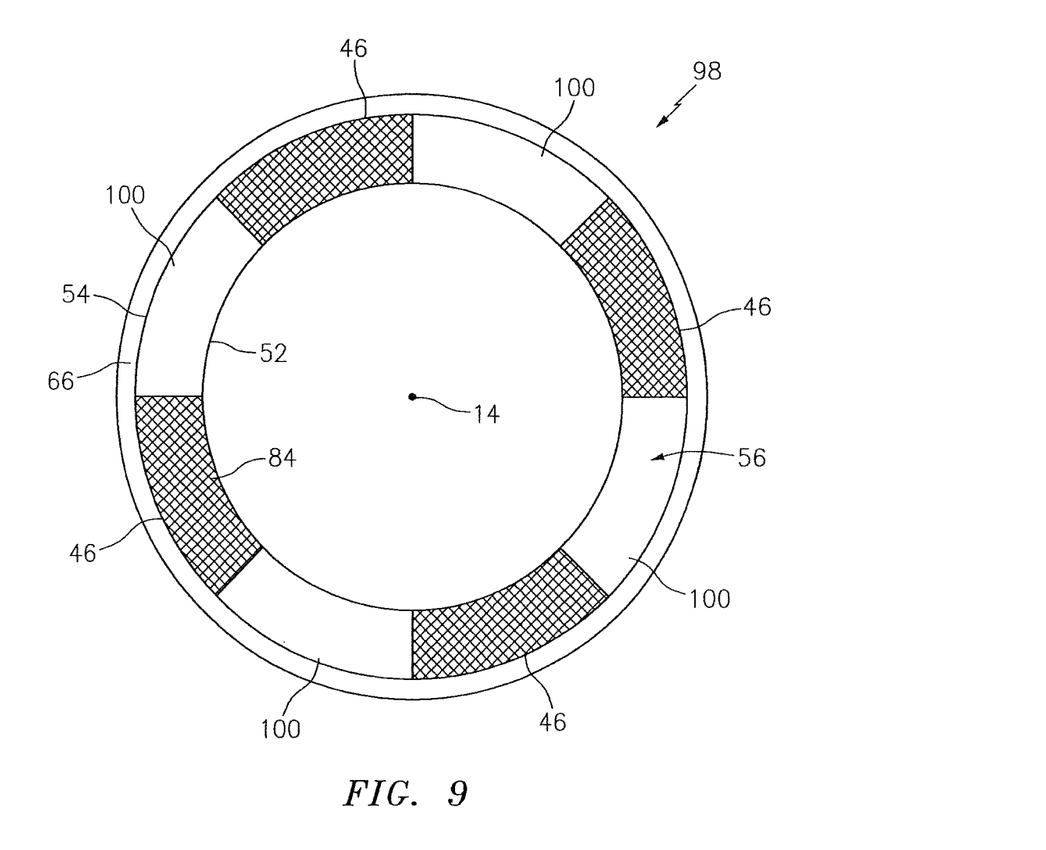
FIG. 9 is an illustration of another heat exchange module.

FIG. 9 illustrates an alternate embodiment heat exchange module 98. In contrast to the heat exchange module 38 of FIG. 2, the first and the second duct walls 52 and 54 of the heat exchange module 98 have circular cross-sectional geometries. In addition, the heat exchange module 98 includes one or more baffles 100. The baffles 100 are adapted to direct the bypass gas through the heat exchangers 46 by substantially plugging spaces between adjacent heat exchangers 46. One or more of the baffles 100 may have similar broadside geometries to those of the heat exchangers 46. In some embodiments, one or more of the baffles 100 are fixedly connected between the first and the second duct walls 52 and 54. In other embodiments, one or more of the baffles 100 are adapted to move between the deployed and the stowed positions in a similar manner as described above with respect to the heat exchangers 46.

In some embodiments, the broadside 84 of one or more of the heat exchangers 46 has a rectangular geometry as illustrated in FIG. 2. In other embodiments, the broadside 84 of one or more of the heat exchangers 46 has an arcuate geometry as illustrated in FIG. 9. The present invention therefore is not limited to any particular heat exchanger geometries.

Figure 10:
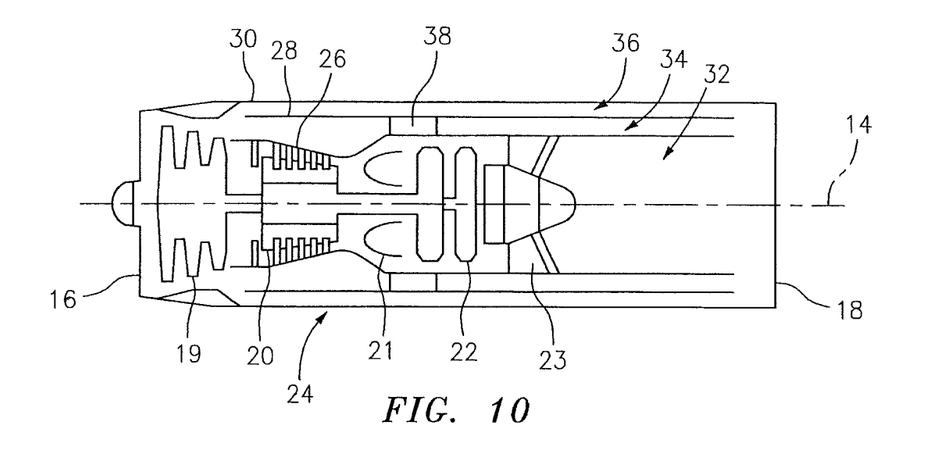
FIG. 10 is a sectional illustration of another turbine engine.

A person of skill in the art will recognize the heat exchange module 38 may be fluidly coupled inline with other engine flowpaths than that described above and illustrated in FIG. 1. In some embodiments, for example as illustrated in FIG. 10, the heat exchange module 38 may be fluidly coupled inline with the second engine flowpath 34. The present invention therefore is not limited to any particular heat exchange module placement within a turbine engine and/or turbine engine configuration.

The terms "upstream", "downstream", "inner" and "outer" are used to orientate the heat exchanger modules described above relative to the turbine engines and the centerline. A person of skill in the art will recognize, however, the heat exchanger modules may be utilized in other orientations than those described above. In alternate embodiments, for example, the heat exchangers may move radially into and out of the inner duct wall. The present invention therefore is not limited to any particular heat exchanger module spatial orientations.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A turbine engine with an axial centerline, comprising:
a heat exchange module including a duct and a heat exchanger;
the duct including a plurality of duct walls and a duct flowpath extending radially between the plurality of duct walls, the duct flowpath extending axially along the axial centerline and through the duct between a first duct end of the duct and a second duct end of the duct;
wherein the heat exchanger is configured to pivot substantially ninety degrees within the duct flowpath between a deployed position and a stowed position.

2. The turbine engine of claim 1, wherein the heat exchanger has an arcuate geometry.

3. The turbine engine of claim 1, wherein the heat exchanger has a rectangular geometry.

4. The turbine engine of claim 3, wherein at least a portion of a first duct wall of the plurality of duct walls has a polygonal cross-sectional geometry.

5. The turbine engine of claim 4, wherein
the first duct wall of the plurality of duct walls includes a transition segment that extends axially from the first duct end to a heat exchanger segment of the first duct wall;
the heat exchanger segment is the portion of the first duct wall having the polygonal cross-sectional geometry; and
the transition segment has a cross-sectional geometry that transitions from a circular cross-sectional geometry at the first duct end to the polygonal cross-sectional geometry at the heat exchanger segment.

6. The turbine engine of claim 5, wherein
the first duct wall of the plurality of duct walls further includes a second transition segment that extends axially from the second duct end to the heat exchanger segment; and
the second transition segment has a cross-sectional geometry that transitions from a circular cross-sectional geometry at the second duct end to the polygonal cross-sectional geometry at the heat exchanger segment.

7. The turbine engine of claim 4, wherein at least a portion of a second duct wall of the plurality of duct walls has a polygonal cross-sectional geometry.

8. The turbine engine of claim 1, further comprising an actuator that moves the heat exchanger between the deployed position and the stowed position.

9. The turbine engine of claim 1, further comprising:
a baffle arranged circumferentially between the heat exchanger and a second heat exchanger;
wherein the heat exchange module further includes the second heat exchanger, and the second heat exchanger is arranged within the duct flowpath.

10. The turbine engine of claim 1, wherein
the heat exchange module further includes a second heat exchanger arranged within the duct flowpath; and
the second heat exchanger is configured to pivot within the duct flowpath between a deployed position and a stowed position.

11. The turbine engine of claim 1, further comprising a first case, a second case and a third case, wherein
a central core flowpath is formed within the first case;
a first bypass flowpath is formed radially between the first case and the second case; and
a secondary bypass flowpath is formed radially between the second case and the third case.

12. A turbine engine with an axial centerline, comprising:
a heat exchange module including a duct and a heat exchanger;
the duct including a plurality of duct walls and a duct flowpath extending radially between the plurality of duct walls; and
the duct flowpath extending axially along the axial centerline and through the duct between a first duct end of the duct and a second duct end of the duct;
wherein the heat exchanger is configured to pivot ninety degrees about a pivot axis within the duct flowpath between a deployed position and a stowed position; and
wherein the pivot axis extends radially relative to the axial centerline.

13. The turbine engine of claim 12, wherein the pivot axis is perpendicular to the axial centerline.

14. The turbine engine of claim 12, wherein the heat exchanger has a rectangular geometry.

15. The turbine engine of claim 14, wherein at least a portion of a first duct wall of the plurality of duct walls has a polygonal cross-sectional geometry.

16. The turbine engine of claim 15, wherein
the first duct wall of the plurality of duct walls includes a transition segment that extends axially from the first duct end to a heat exchanger segment of the first duct wall;
the heat exchanger segment is the portion of the first duct wall having the polygonal cross-sectional geometry; and
the transition segment has a cross-sectional geometry that transitions from a circular cross-sectional geometry at the first duct end to the polygonal cross-sectional geometry at the heat exchanger segment.

17. The turbine engine of claim 16, wherein
the first duct wall of the plurality of duct walls further includes a second transition segment that extends axially from the second duct end to the heat exchanger segment; and
the second transition segment has a cross-sectional geometry that transitions from a circular cross-sectional geometry at the second duct end to the polygonal cross-sectional geometry at the heat exchanger segment.

18. A turbine engine with an axial centerline, comprising:
a heat exchange module including a duct and a heat exchanger;
the duct including a plurality of duct walls and a duct flowpath extending radially between the plurality of duct walls; and
the duct flowpath extending axially along the axial centerline and through the duct between a first duct end of the duct and a second duct end of the duct;
wherein the heat exchanger is configured to pivot ninety degrees about a pivot axis within the duct flowpath between a deployed position and a stowed position; and
wherein the heat exchanger is completely within the duct flowpath in both the deployed position and the stowed position.

* * * * *